Nov. 16, 1943.  E. G. GOODELL  2,334,621
METHOD OF TREATING SULPHITE WASTE LIQUORS
Filed Sept. 26, 1940
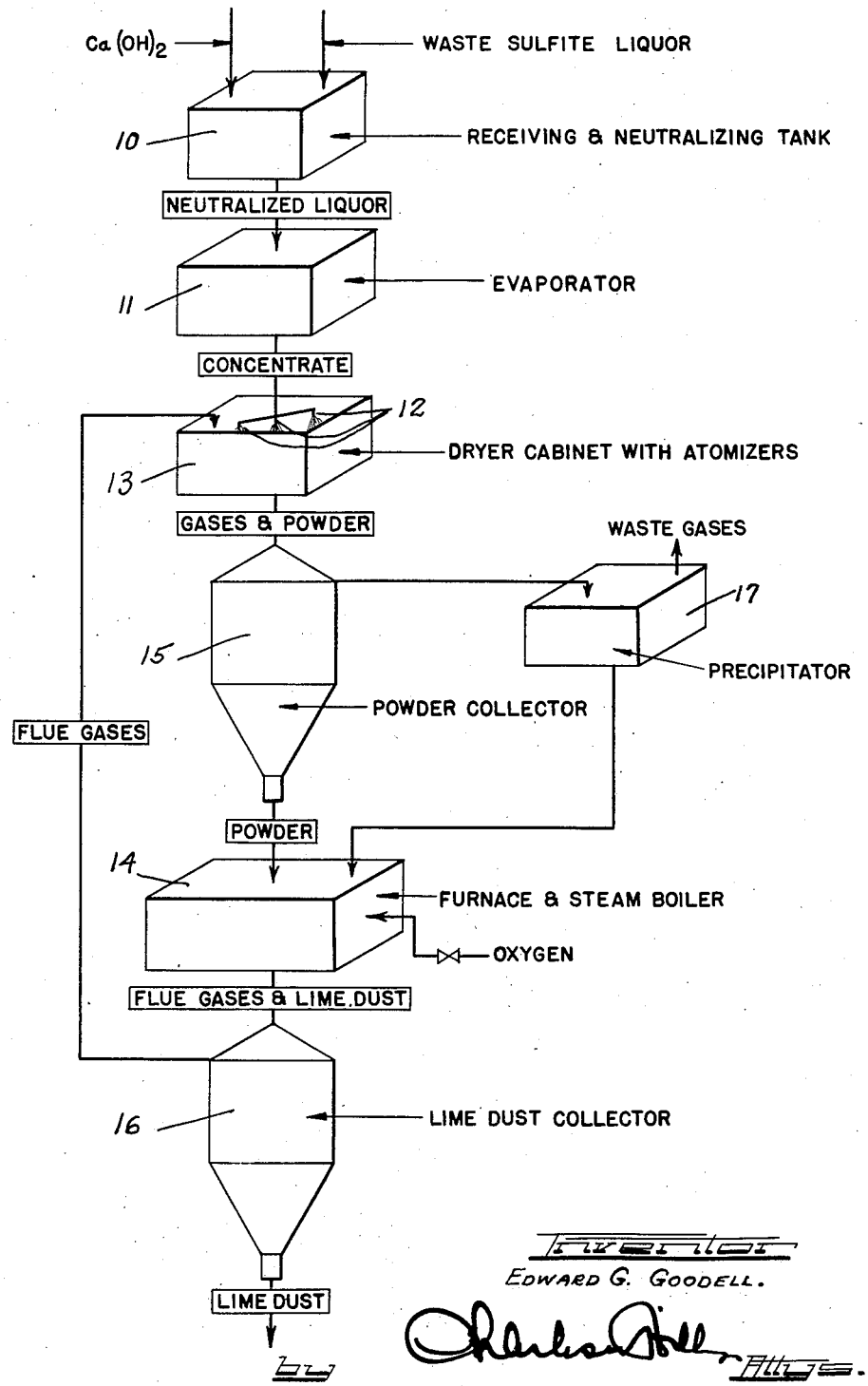
Inventor
Edward G. Goodell.

Patented Nov. 16, 1943

2,334,621

UNITED STATES PATENT OFFICE 2,334,621

METHOD OF TREATING SULPHITE WASTE LIQUORS

Edward G. Goodell, Stevens Point, Wis.

Application September 26, 1940, Serial No. 358,482

4 Claims. (Cl. 23—48)

This invention relates to a method for the disposal of waste sulphite liquor by spray drying and burning of the dried product.

In the manufacture of chemical paper pulp by the sulphite process large amounts of waste cooking liquors are produced that contain, besides much of the lignin of the wood or other vegetable material being pulped and degradation and sulphonation products thereof, spent inorganic chemicals from the original cooking liquor, in particular, sulphur dioxide and sulphites. Pools of sulphite waste liquor and gases therefrom tend to pollute the air in their neighborhood, and the dumping of the liquor into lakes, rivers or streams is usually objected to by riparian owners, sometimes even forbidden as a public nuisance. It has been proposed to disposed of sulphite waste liquor to drying and burning the dried product, but as far as I know no satisfactory method on this order has heretofore been developed.

I have found that sulphite waste liquor may safely and inexpensively be disposed of by a method including concentrating the liquor and spray drying the concentrated liquor in a gaseous medium containing but little oxygen. Such a medium suitably contains the gaseous products of a subsequent combustion of the dried solid content of the liquor. The combustion further yields a solid residue that may be utilized in the manufacture of paper pulp.

It is therefore an important object of this invention to provide an effective solution for the problem of air and stream pollution by waste liquors necessarily formed in the sulphite pulp process.

Another object of the invention is to provide a safe method of spray drying waste sulphite liquor and burning the dried product that will reclaim heat and chemical values from the liquor, and thus reduce the cost of disposal of the liquor.

Other and further objects of the invention will become apparent to those skilled in the art from the following description and appended drawing, which illustrates a preferred form of the present invention.

On the drawing:

The drawing illustrates schematically a type of apparatus for carrying out my process and includes a flow sheet of the various steps of my process.

The sulphite waste liquor, as drained from the pulp, may be collected in a receiving tank 10. Calcium or magnesium oxide or hydroxide may be added to the spent liquor in the receiving tank for the purpose of neutralizing sulphurous acid and bisulphites. By reducing the acidity of the spent liquor excessive corrosion of evaporation equipment is avoided, and a part of the sulphur content of the liquor may be reclaimed in the form of a precipitate of calcium sulphite for return to the acid system of the pulping process.

The waste liquor may be then concentrated to a total solids content of nominally about 55 percent in a multiple effect vacuum evaporator indicated by the reference numeral 11.

The neutralized and concentrated liquor is then atomized in a gaseous medium having a temperature of from 200° to 800° F. with high speed mechanical atomizers 12 disposed in a dryer cabinet 13. Drying to powdered form is effected with waste heat flue gases flowing from a steam boiler unit 14 including a furnace in which the dried powder is burned. More particularly, the spray dried powder may be drawn from the dryer cabinet along with the gases by an induced draft fan (not shown) and delivered to a powder collector 15. From the latter, the collected powder is fed by a screw conveyor (not shown) or in other suitable manner to the furnace, mixed with air in amounts specified hereinbelow, blown into the furnace in the manner of powdered coal and so burned completely with the evolution of about 8000 B. t. u. per pound of powder.

Between the furnace and dryer cabinet, a line dust collector 16 is suitably interposed, to remove the lime dust from the flue gases and avoid the building up of an objectionable amount of inorganic matter in the powder from the dryer. Since no collectors are perfectly efficient, some recirculation of lime dust will occur.

The gases leaving the powder collector 15 pass either directly to a chimney or they may be led through a scrubber or absorption tower or precipitator 17 before being vented through the chimney. Acid or alkaline scrubbing media may be used, including sulphite liquor, in which latter case, some evaporation and fume recovery is effected. If a precipitator is used, the powder collected by the precipitator may be conveyed to the furnace for burning.

The temperature of the gases from the boiler is usually about 750° F. but may be higher or lower, depending on the concentration of organic solids in the sulphite liquor. The temperature of the gases leaving the dryer cabinet is as a rule from 200° to 250° F.

To avoid explosions in the dryer cabinet, the oxygen content of the gases from the boiler is held at a minimum, below 10%, say from about 4 to 10 percent. The moisture content of the gases in the dryer cabinet resulting from the evaporation of the water from the sulphite liquor is a further insurance against explosions.

The spray dried powder likely comprises lime, calcium sulphate, calcium lignosulphonate, sugars, sugar acids, vanillin-and terpene-like substances or decomposition products thereof formed during drying. An analysis of the dry powder shows 6.5 percent total sulphur distributed as 0.6 percent sulphite sulphur, 3.1 percent inorganic bound sulphur (sulphate and the like), and 2.8 percent sulphur in lignosulphonic acid.

The composition of the lime dust recovered in the lime dust collected from the waste heat flue gases is determined by reactions in the dryer cabinet and boiler furnace between the lime and sulphur content of the spray dried liquor. The following analyses show typical compositions of such lime dust.

|  | A | B |
|---|---|---|
|  | Per cent | Per cent |
| Calcium oxide | 32.7 | 46.7 |
| Calcium sulphate | 46.2 | 38.3 |
| Calcium carbonate | 14.3 | 5.2 |
| Calcium sulphide | 1.3 | 2.4 |
| Calcium sulphite |  | 1.3 |
| Magnesium oxide | 1.0 |  |
| Iron and aluminum oxides | 3.0 | 2.4 |
| Acid insoluble | 1.1 | 1.2 |

The calcium oxide present as such, as shown in these analyses, is probably a product of the reactions taking place in the furnace.

As indicated by analysis of the exit gases from the system, practically all objectionable components have been removed, rendering the exit gas odorless and non-injurious to vegetation. The removal of solids such as lime dust is also complete. The disclosed method of sulphite liquor disposal thus entails no air or stream pollution.

The calcium sulphate content of the lime dust recovered in the dust collector may be utilized in sulphate pulping processes. Calcium sulphate is presently replacing the more expensive sodium sulphate in the smelting furnaces of sulphate process mills. The sulphur of the calcium sulphate combines in the sulphate furnace with sodium compounds, being reduced to sodium sulphide.

The calcium oxide content of my burned lime dust is available for use in the sulphate furnace for causticizing fused sodium carbonate.

Dolomite lime comprising 25 to 40 percent or more magnesium oxide is used in some sulphite mills. Since the reactions of calcium and magnesium are similar, the dust collected from dried and burned liquors from such mills may also be utilized as indicated hereinabove.

The production of one ton of pulp by the sulphite process entails the incidental production of 2280 pounds of sulphite waste liquor solids recoverable by spray drying. Since each pound of spray dried product on combustion yields 8000 B. t. u., a total of 18,000,000 B. t. u. may be recovered for each ton of pulp produced. The heat content of one ton of coal of 14,000 B. t. u. per pound being 28,000,000 B. t. u., it is evident that a considerable saving of heat values is effected by the present invention.

It should be understood that various details of the present invention may be varied within a wide range without departing from the principles of the invention. It is therefore not my purpose to limit the patent granted on this invention otherwise than necessitated by the scope of the appended claims.

I claim as my invention:

1. In a process of disposing of a waste calcium sulphite liquor comprising neutralizing said liquor with lime, spray drying said liquor in a spray drying zone containing a hot gaseous medium to form a powdery product, collecting the powdery product in a collection zone, and subsequently burning said powder, the improvement comprising conducting said drying and burning as two separate operations in a closed system, suspending said powder in an oxygen containing gaseous medium and burning said powder while suspended in said gaseous medium, said gaseous medium containing an amount of oxygen such that the resulting gaseous products of combustion will contain not more than 10 percent oxygen, said burning being effected in such manner that lime containing dust resulting from the burning of said dust will continuously be suspended in the gaseous products of said combustion without forming a bed, separating and collecting a major proportion of said lime containing dust from said gaseous products in a second collection zone, subsequently effecting said spraying in said gaseous products, and continuously recirculating a minor proportion of said lime containing dust from said second collection zone to said spray drying zone.

2. A process of recovering values from waste calcium sulphite liquor comprising spray-drying said liquor in a stream of hot gases to form a finely divided mixed inorganic and organic powder suspended in said gases, suspending said mixed powder in an oxygen containing gaseous medium and burning said powder while suspended in said gaseous medium under such conditions and for such a time that the calcium content of the powder is converted into minor proportions of calcium carbonate and by reaction, respectively, with the oxygen content of said gaseous medium and with the sulphur content of the powder into major proportions of calcium oxide and of calcium sulphate, and collecting the resulting inorganic powder containing calcium oxide, calcium sulphate and calcium carbonate.

3. A process of recovering values from waste calcium sulphite liquor comprising spray-drying said liquor in a stream of hot gases containing the products of combustion of the solids of said liquor, to form a finely divided mixed organic and inorganic powder, collecting said mixed powder, suspending said mixed powder in an oxygen containing gaseous medium and burning said powder while suspended in said gaseous medium under such temperature conditions and for such a length of time that the calcium content of the powder is converted into minor proportions of calcium carbonate and into major proportions of calcium oxide and of calcium sulphate by reaction, respectively, with the oxygen content of said gaseous medium and with the sulphur content of the powder, removing the resulting inorganic powder from the combustion zone as a suspension in the gaseous products of combustion, and collecting said inorganic powder.

4. A process of recovering values from waste calcium sulphite liquor comprising spray drying said liquor at a temperature of from 200° to 800° F. in a stream of gases containing the products of a subsequent combustion of the solids content of said liquor and heated by the heat of said combustion of said solids to form a finely divided mixed organic and inorganic powder suspended in said gases, collecting said mixed powder, suspending said mixed powder in an oxygen containing gaseous medium and burning said powder completely while suspended in said gaseous medium under such temperature conditions and for such a length of time that the alkaline earth metal content of the powder is converted in minor proportions to alkaline earth metal carbonate and in major proportions to alkaline earth metal oxide and sulphate by reaction with the oxygen content of said gaseous medium and with the sulphur content of the powder, separating a substantial amount of said inorganic powder from said gaseous products of combustion, and directing a stream of said gaseous products of combustion through the space in which said liquor is being spray-dried to dry the same.

EDWARD G. GOODELL.